United States Patent [19]

van der Lely et al.

[11] Patent Number: 4,984,418
[45] Date of Patent: Jan. 15, 1991

[54] MOWING MACHINE

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 307,151

[22] Filed: Feb. 7, 1989

Related U.S. Application Data

[63] Continuation of Ser. No. 88,974, Aug. 24, 1987, abandoned, which is a continuation of Ser. No. 878,520, Jun. 23, 1986, abandoned, which is a continuation of Ser. No. 743,870, Jun. 11, 1985, abandoned, which is a continuation of Ser. No. 498,196, May 9, 1983, abandoned.

[30] Foreign Application Priority Data

Sep. 10, 1981 [NL] Netherlands .......................... 8104178
Sep. 9, 1982 [WO] PCT Int'l Appl. ... PCT/NL82/00029

[51] Int. Cl.$^5$ .......................................... A01D 34/66
[52] U.S. Cl. .......................................... 56/13.6; 56/6
[58] Field of Search ............................ 56/6, 13.6

[56] References Cited

U.S. PATENT DOCUMENTS

| | | |
|---|---|---|
| 2,625,784 | 1/1953 | Kelsey . |
| 3,507,102 | 4/1970 | Kline et al. .......................... 56/13.6 |
| 3,513,648 | 5/1970 | Kline et al. .......................... 56/13.6 |
| 3,708,966 | 1/1973 | Reber .......................... 56/6 |
| 4,149,359 | 4/1979 | van der Lely .......................... 56/13.6 |
| 4,188,773 | 2/1980 | Kaetzel .......................... 56/6 |
| 4,197,692 | 4/1980 | Weber .......................... 56/13.6 |
| 4,227,365 | 10/1980 | van der Lely et al. .......................... 56/13.6 |
| 4,231,216 | 11/1980 | Weber .......................... 56/13.6 |
| 4,299,077 | 11/1981 | Wattron .......................... 56/13.6 |

FOREIGN PATENT DOCUMENTS

| | | |
|---|---|---|
| 2722554 | 12/1977 | Fed. Rep. of Germany . |
| 2007716B2 | 6/1981 | Fed. Rep. of Germany . |
| 3127978A1 | 1/1983 | Fed. Rep. of Germany . |
| 1558813 | 2/1969 | France . |
| 2378437 | 8/1978 | France . |
| 1195607 | 6/1970 | United Kingdom . |
| 1472642 | 5/1977 | United Kingdom . |
| 1564492 | 4/1980 | United Kingdom . |
| 2030435 | 4/1980 | United Kingdom . |

Primary Examiner—Paul J. Hirsch
Attorney, Agent, or Firm—Penrose Lucas Albright

[57] ABSTRACT

A mowing machine comprises a main frame (6) made up of driving units (36) and intermediate pieces (35) which are mounted alternately on a tie member (42). The tie member (42) is placed under tension, so pressing the driving units (36) and the intermediate pieces (35) together to make the main frame (6) substantially rigid. The tie member (42) is positioned substantially centrally of the driving units (36) and the intermediate pieces (35) so as to provide even loading of their mating faces. The driving units (36) have cutting units (8) with flexible hoods. The cutting units are driven by a drive shaft (41) through bevel gearing (46, 47). The direction of rotation of each cutting unit (8) can be altered by removing the gear (46) and replacing it to the other way round.

28 Claims, 8 Drawing Sheets

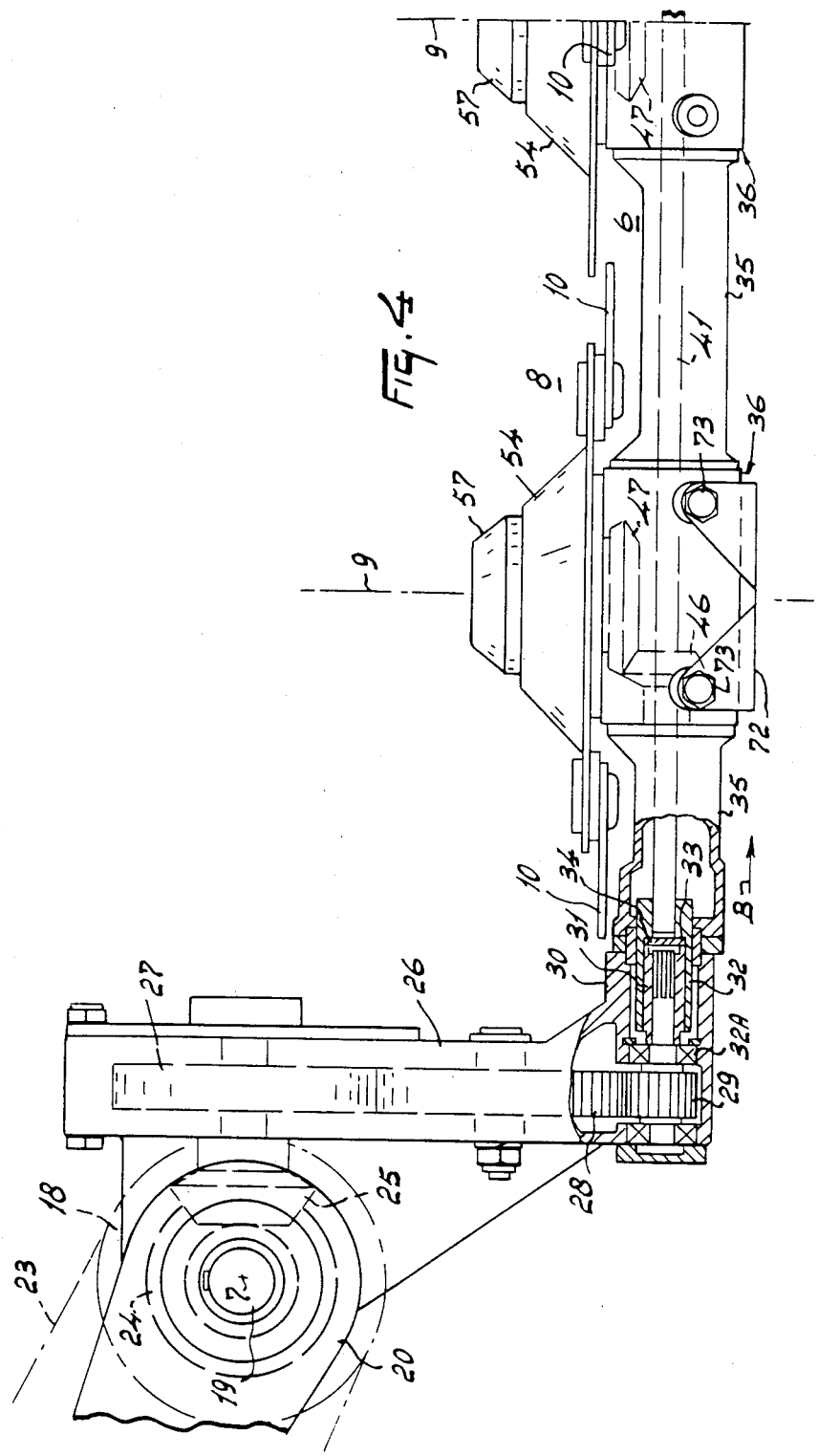

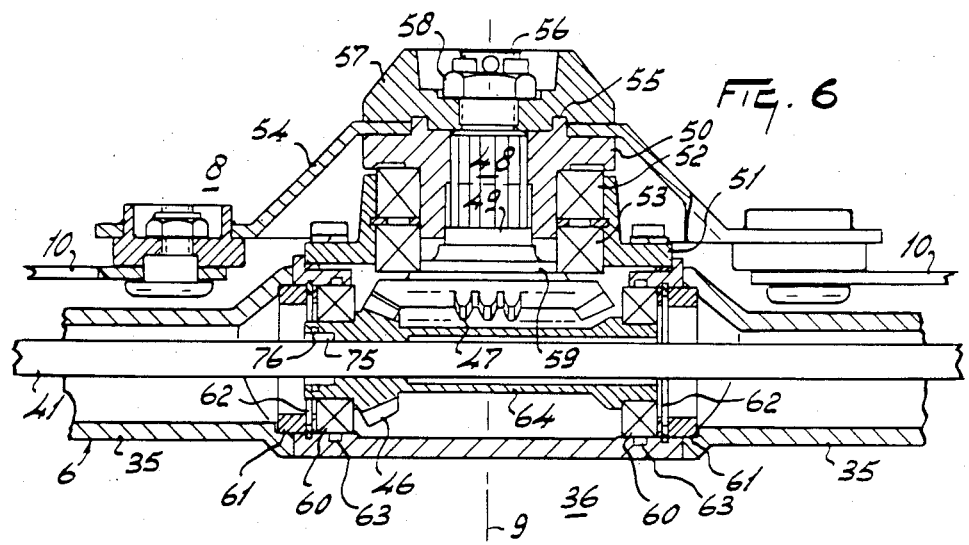
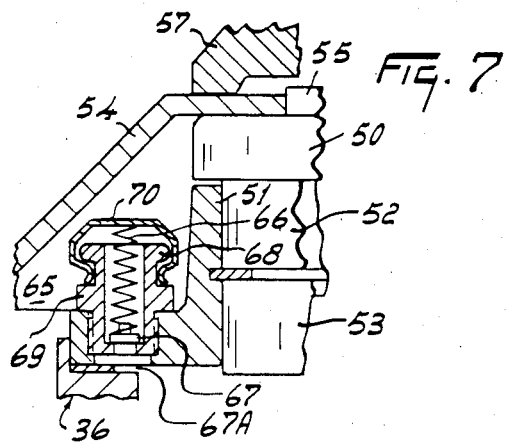
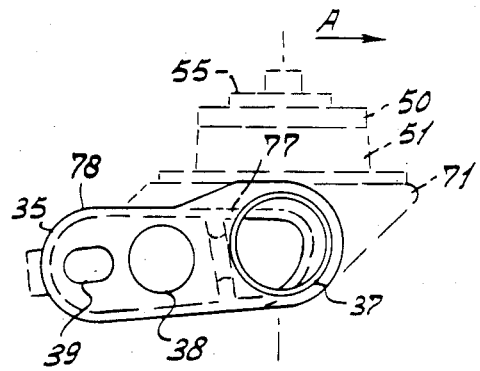
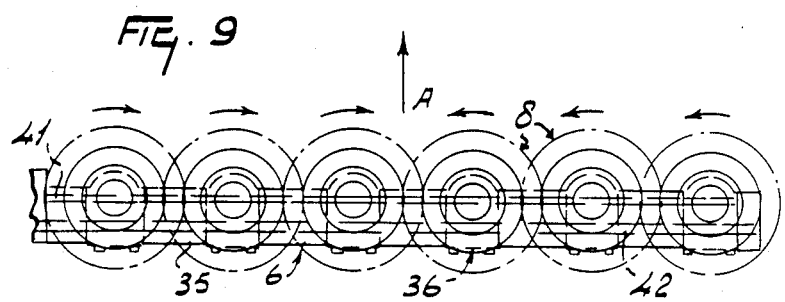

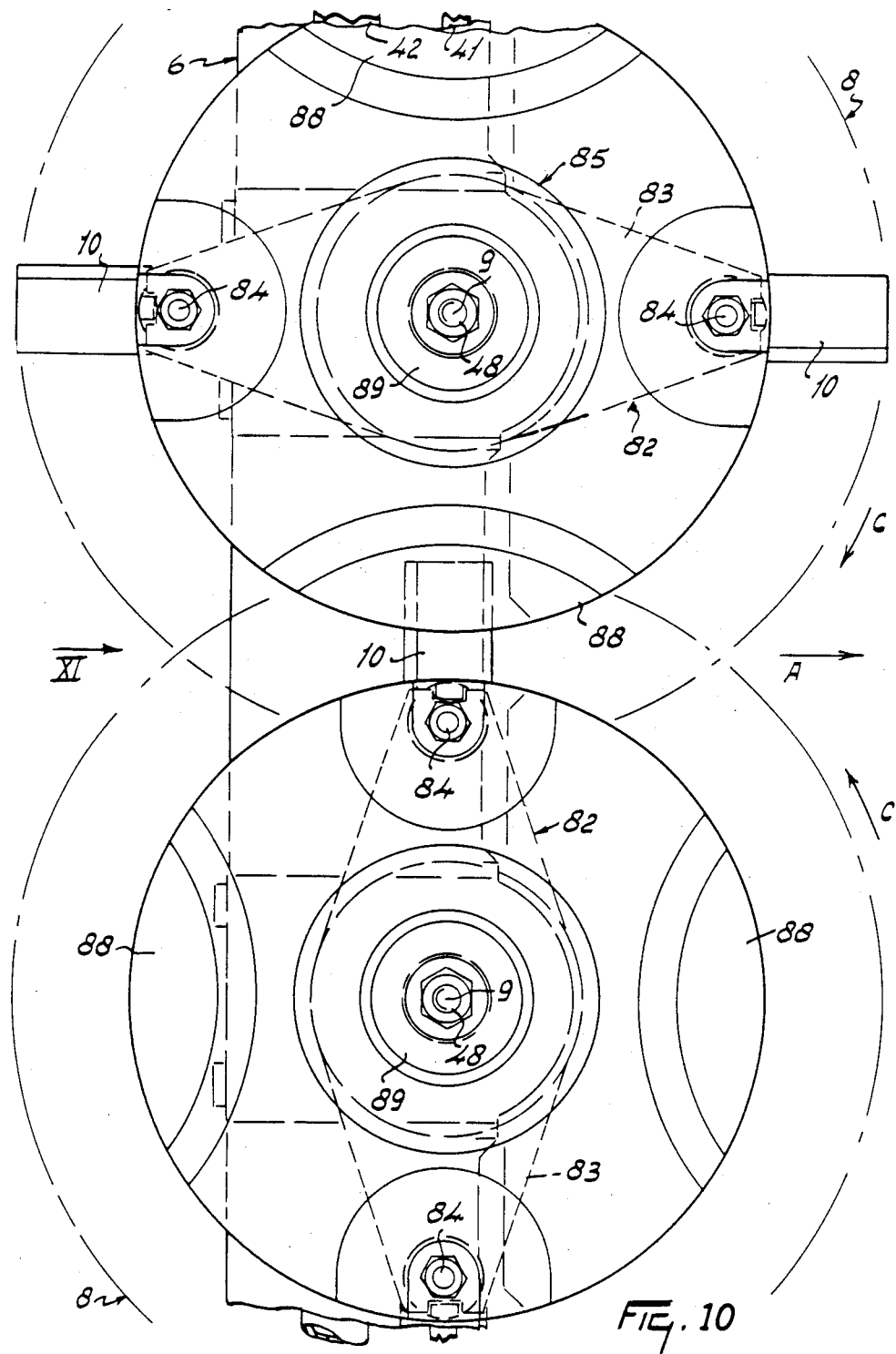

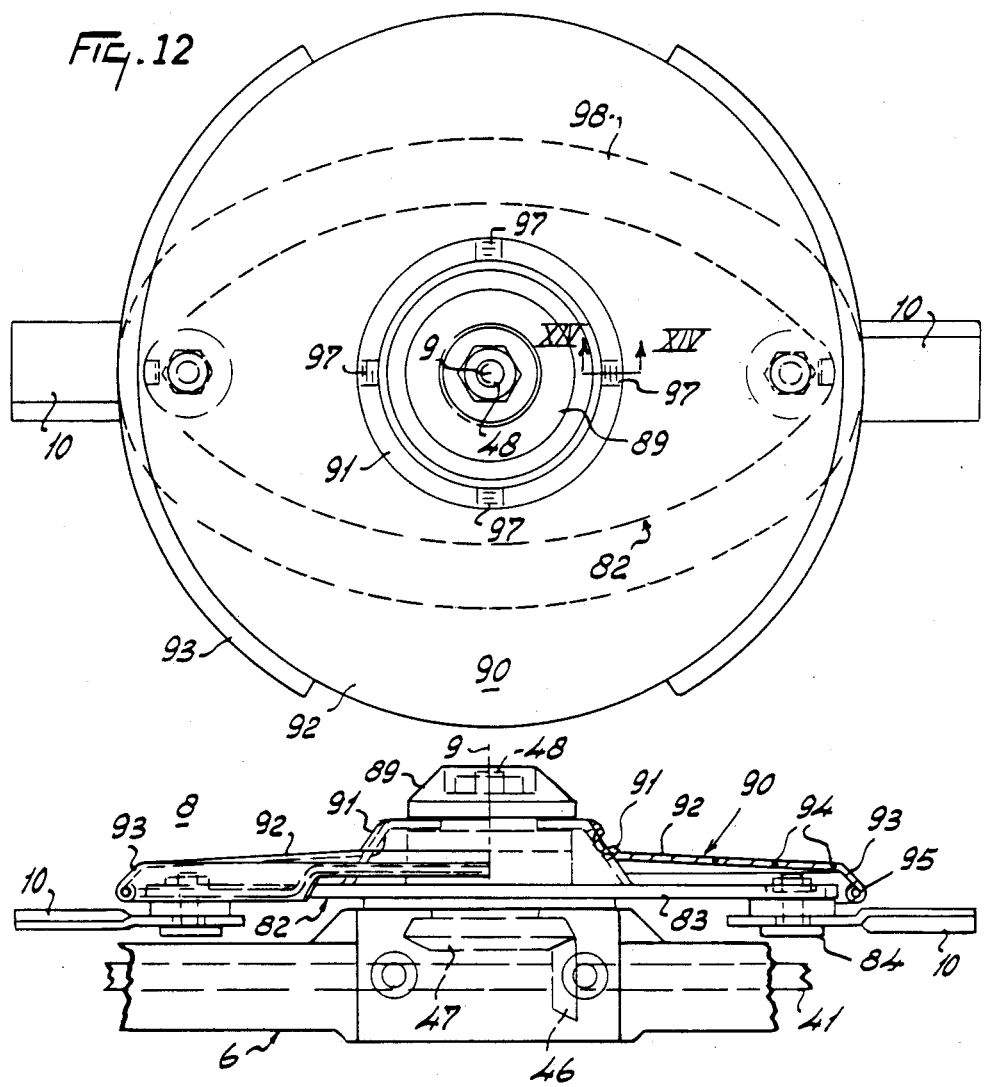
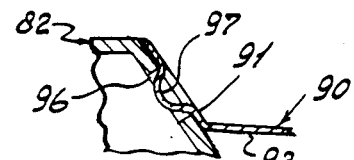

MOWING MACHINE

This is a continuation application of application Ser. No. 088,974 filed Aug. 24, 1987 which was a continuation of application Ser. No. 878,520 filed June 23, 1986, which was a continuation of application Ser. No. 743,870 filed June 11, 1985 which continued application Ser. No. 498,196 filed May 9, 1983, all now abandoned.

SUMMARY OF THE INVENTION

This invention relates to a mowing machine having a main frame comprising a plurality of driving units on which cutting units are mounted for rotation about upwardly directed axes. A tie member extends through the driving units.

Such mowing machine are disclosed in Dutch Patent Application Nos. 76.05371 and 79.07139. This construction has the advantage of a simple assembly of the main frame and of the possibility of lengthening or shortening the main frame, and thus of the machine as a whole, in a simple manner. A disadvantage of the known machines, however, is that the driving units are not uniformly loaded.

According to the present invention, the tie member is located at a considerable distance both from the leading and trailing edges of the main frame in a manner such that a tensile force exerted on the tie member is applied at least substantially centrally to the driving units.

In a further embodiment of the machine according to the invention a hood is arranged near at least part of the path covered by the cutters.

In devices known from the French Patent Specification Nos. 1,483,721, 1,499,211 and 1,524,150 and from Swiss Patent Specification No. 68,124 the hood serves as a protecting member for subjacent construction parts and—if the hood rotates with the cutting units—as a transport device for the crop cut by the mowing cutter.

Such known mowing machines involve the drawback that stones lying in the crop to be mown are carried to the rear by the mowing cutters and can be jammed between the top side of a frame beam located below the mowing cutters and comprising the driving gear of the mowing unit and the underside of the hood or between the ground and the hood when the driving gear is disposed above the same. Jamming of stones or other objects may have serious consequence for the construction of the mowing machine, since material destruction may occur. One object of the invention is to avoid this disadvantage as far as possible.

According to the invention the hood is flexible.

Owing to the flexible structure of the hood fastened to the machine it can yield to objects jammed on the bottom or top side so that these objects can as yet be conducted away.

For a better understanding of the present invention and to show how it may be carried into effect, reference will now be made, by way of example, to the accompanying drawings, in which:

BRIEF DESCRIPTION OF THE DRAWINGS

FIG. 4 is a partly sectional view taken in the direction of the arrow IV in FIG. 2;

FIG. 6 is a sectional view taken on the line VI—VI in FIG. 2;

FIG. 7 is a sectional view taken on the lines VII—VII in FIG. 2.

FIG. 8 is a sectional view taken on the line VIII—VIII in FIG. 2.

FIG. 9 is a schematic plan view of the mowing machine of FIGS. 1 to 8;

FIG. 10 is a plan view of two cutting units driven in opposite senses in the machine shown in FIG. 1;

FIG. 12 is a plan view of two cutting units in a further embodiment;

FIG. 13 is a rear view of one of the cutting units shown in FIG. 12 partly in an elevational view and partly in a sectional view; and FIG. 14 is a sectional view taken on the line XIV—XIV in FIG. 12.

Figure 1:
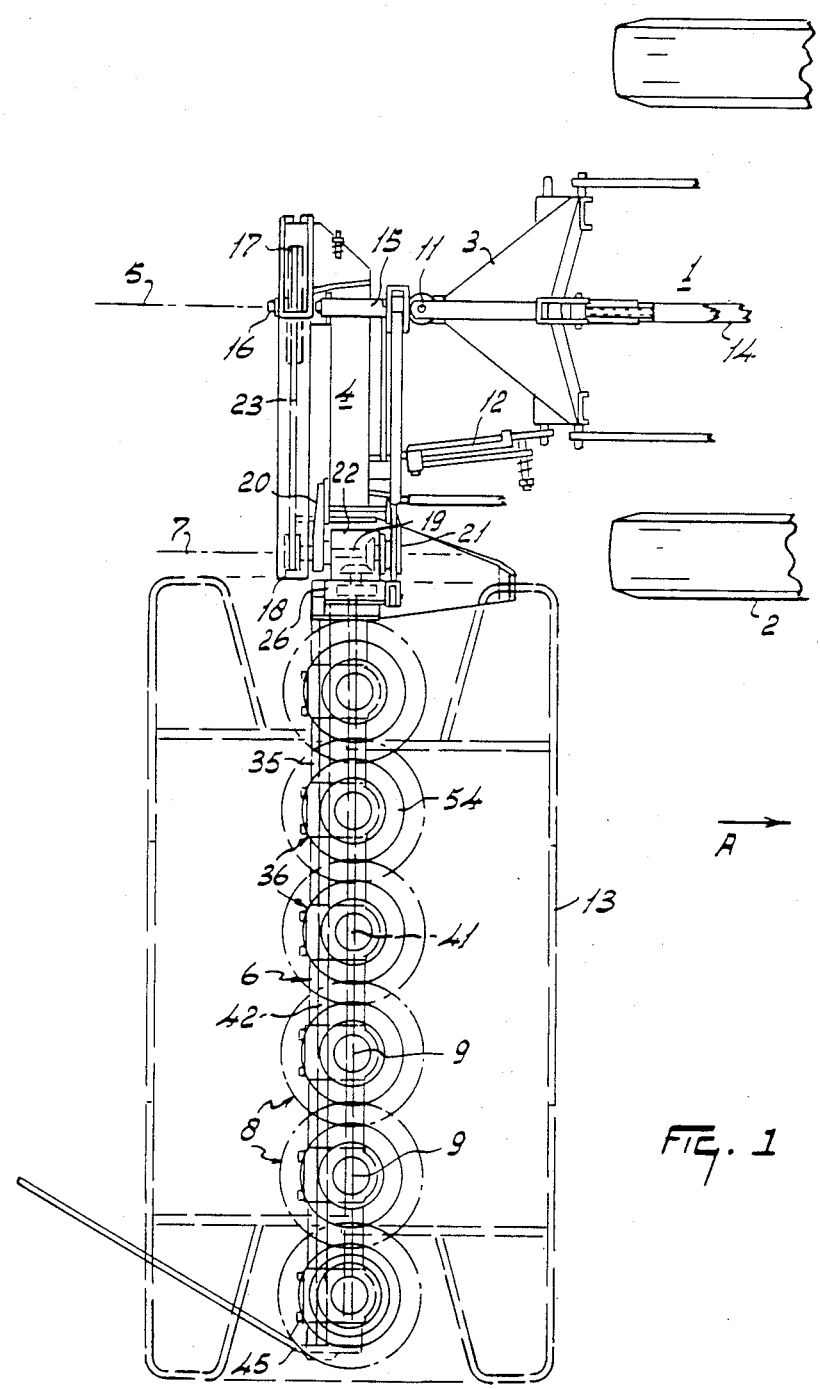
FIG. 1 is a plan view of a mowing machine hitched to a tractor.

The mowing machine shown in FIG. 1 comprises a fastening trestle 3 which is hitched to a three-point lifting device 1 of a tractor 2. At the rear, the trestle 3 carries an intermediate frame 4, which is pivotable with respect to the trestle 3 about a substantially horizontal pivotal axis 5 extending in the intended direction of operative travel of the machine, as indicated by an arrow A in FIGS. 1, 2 and 9. In the illustrated embodiment, the axis 5 lies substantially in the vertical, longitudinal central plane of the tractor 2. The intermediate frame 4 extends away from the axis 5 transversely of the direction A to a position substantially level with a lateral boundary face of the tractor 2.

A main frame 6 is connected to the end of the intermediate frame 4 away from the pivotal axis 5 and is pivotable with respect to the intermediate frame 4 about a pivotal axis 7. The axis 7 is parallel to the axis 5 and is located just within the lateral boundary of the tractor 2. Viewed on plan, the main frame 6 is in line with the intermediate frame 4 and thus also extends transversely of the direction A.

In the illustrated embodiment the main frame 6 carries six cutting units 8, which are drivable in rotation about upwardly directed rotary axes 9. The rotary axes 9 may be vertical, but preferably they are tilted slightly forward, with respect to the direction A, from bottom to top. Each cutting unit 8 is provided with one or more outwardly extending cutters 10. The tip of a cutter 10 of the cutting unit nearest the intermediate frame 4 described a circle which extends substantially up to the nearest boundary face of the tractor 2, that boundary face being parallel to the direction A.

The intermediate frame 4 and the main frame 6 are pivotable with respect to the trestle 3 about an upwardly directed pivotal axis 11 which lies substantially in the vertical longitudinal central plane of the tractor 2 and which provides the connection between the intermediate frame 4 and the trestle 3. In normal operation, pivoting about the axis 11 is prevented by an overload mechanism 12 which is arranged at a distance from the central longitudinal plane of the tractor and connects the intermediate frame 4 to the trestle 3.

A framework 13 extends over the main frame 6. Flexible walls are suspended from the periphery of the framework 13 and extend to the ground to protect bystanders against objects such as stones which might be thrown up by the cutting units 8.

The mowing machine has an input shaft which is journalled in a sleeve 15 and which can be connected to the power take-off shaft of the tractor 2 by an auxiliary shaft 14. The sleeve 15 is rigidly secured to the intermediate frame 4 and extends substantially horizontally in the direction A. The axis of the input shaft 16 coincides with the pivotal axis 5. The input shaft 16 projects from the rear end of the sleeve 15 and the projecting portion carries a pulley 17. Near the end of the intermediate frame 4 adjacent the main frame 6 there is a pulley 18 which is mounted on a shaft 19 journalled in lugs 20 and 21 provided on the intermediate frame 4 and in a gear box 22. The gear box 22 is pivotable with respect to the lugs 20 and 21 and is rigidly secured to the main frame 6. The axis of the shaft 19 coincides with the pivotal axis 7. The pulley 17 is drivably connected to the pulley 18 by means of one or more V belts 23 running around the two pulleys. The diameter of the pulley 17 is larger (for example three times larger) than the diameter of the pulley 18. The shaft 19 carrying the pulley 18 is provided with a bevel gear wheel 24 (FIG. 2), which meshes with a bevel gear wheel 25, the rotary axis of which is substantially horizontal during operation and intersects the pivotal axis 7 at right angles. The gear wheel 25 is journalled in a substantially vertical gear box 26, which is rigidly secured to the gear box 22. The shaft of the bevel gear wheel 25 is provided with a gear wheel 27 which is located inside the gear box 26 and meshes with an intermediate gear wheel 28 disposed below it. The intermediate gear wheel 28 meshes with a gear wheel 29 disposed beneath it. The rotary axes of the gear wheels 27, 28 and 29, which are all spur gears, are parallel to one another and located vertically one above the other. The diameter of the bevel gear wheel 24 is significantly larger than the diameter of the bevel gear wheel 25, and the substantially equal diameters of the gear wheels 27 and 28 are considerably larger than the diameter of the lower gear wheel 29. The gear box 26 has at the bottom an outwardly projecting collar 30 (FIG. 4), which surrounds the shaft of the gear wheel 29 extending in the same direction. The outwardly directed end part of the shaft of the gear wheel 29 is provided with axial splines co-operating with further axial splines on the inside of a sleeve 31 which fits over the protruding shaft portion of the gear wheel 29 and is located inside the collar 30. The end of the sleeve 31 facing the gear wheel 29 abuts a bearing 32A which is located between the sleeve 31 and the gear wheel 29 and is one of the bearings supporting the gear wheel 29. The end of the sleeve 31 away from the bearing 32A projects beyond the outer end of the shaft which extends from gear wheel 29. The sleeve 31 is surrounded by part of a tie piece 32 having a bore, opening towards the gear wheel 29, which grips the sleeve 31. This part of the tie piece 32 is rotationally connected with the sleeve 31 in a manner not shown, for example, by means of splines. The part of the tie piece 32 away from the gear wheel 29 is also shaped as a sleeve, but with a smaller diametral dimension. This part defines an outwardly opening recess having a square transverse cross-section. This square recess opens into the bore at a shoulder 33. Before slipping the tie piece 32 onto the sleeve 31, a supporting plate 34 is disposed on the shoulder 33, so that this plate 34 is clamped between the sleeve 31 and the shoulder 33.

The main frame 6 is clamped to the collar 30 in a manner to be described more fully later, and extends outwardly away from the collar.

Before describing in detail the construction and assembly of the main frame, the associated driving units and the cutting units, the general structure of the main frame will be discussed. The main frame 6 is made up of a sequence of separate parts comprising (beginning at the collar 30) a separate intermediate piece 35 (FIG. 4), a separate driving unit 36 (comprising a rotatable part at the top forming the cutting unit 8), an intermediate piece 35, another driving unit 36 (again comprising a rotatable cutting unit 8), an intermediate piece 35 and so on. The outermost part in this sequence is a driving unit terminated by an end piece to be described more fully later. The intermediate pieces 35 are separate parts which may have identical shapes and dimensions. As viewed in the direction B (FIG. 4) or in the opposite direction, the end faces of the intermediate pieces 35 all have the same shape and dimensions. The lengths of the intermediate pieces 35 measured in the direction B may be the same for all of the intermediate pieces, but they can alternatively be wholly or partly different. Basically the driving units 36 are identical. This also applies to the cutting units 8 provided on the driving units 36, but the lengths of the cutters 10 may be different for different cutting elements.

For the sake of clarity, FIG. 8 is an elevational view, in the direction opposite the direction B. The solid-line part of FIG. 8 applies to all of the intermediate pieces 35. The solid-like part of FIG. 8 together with the broken-line part applies to an elevational view of a driving unit 36 taken opposite the direction B. The intermediate pieces 35 and the housings of the driving units 36 are made from, for example, cast iron. FIG. 8 shows that the lateral boundary faces of the intermediate pieces 35 and of the driving units 36 have three holes 37, 38 and 39. These holes extend in the direction B across the part concerned up to the other boundary face. The hole 37 serves to receive a single main shaft 41 extending in the direction B through all of the intermediate pieces 35 and driving units 36. The hole 38 serves to receive a tie member in the form of a tie rod 42 which also extends through all of the intermediate pieces 35 and driving units 36. This tie rod is heavily loaded in tension and is anchored at its ends on the inner and outer driving unit or intermediate piece respectively in the collar 30 so that all driving units and intermediate pieces are subjected to a compressive force parallel to the direction B which is equal to the tensile force in this tie rod.

The hole 38 for receiving the tie rod is located approximately at the middle of the dimension of the end face in the direction A so that the compressive force exerted by the tie rod on the intermediate pieces and driving units acts centrally in order to avoid gaps between the intermediate pieces and the driving units and in order to obtain an assembly which is resistant to bending, while the entire mating surface of each intermediate piece and driving unit is uniformly loaded.

On the side of the hole 38 away from the hole 37 the end face of each intermediate piece and driving unit has a hole 39. This hole 39 is important in the manufacture of the castings for releasing the cores of the castings. The wall thickness of each intermediate piece and driving unit is relatively small so that a large hollow space can be enclosed and the weight can be kept low, while the structural rigidity is sufficient. The general form of the intermediate pieces and the housings of the driving units, as viewed in the direction A, is shown in FIG. 4. In the central region of each intermediate piece 35 the vertical and transverse dimensions are smaller than in the short regions near the adjacent driving units. In particular, it is significant that the central region of the leading edge of the intermediate piece 35 is set back from the end regions of the leading edge. The plan view of FIG. 2 indicates the distance 40 measured in the direction A between the leading edge of an intermediate piece 35 (viewed on plan) and the foremost boundary of the main driving shaft 41 of the main frame, such frame being composed of any suitable known material. In order to maximize the amount by which the central region of the leading edge of the intermediate piece is set back from the end regions, the dimension 40 is minimized and is substantially equal to the wall thickness of the casting of the intermediate pieces. Consequently, the leading edge is close to the opening for the main driving shaft. Thus, when the cutters of neighboring driving units are rotating in opposite senses, (as shown by way of example in FIG. 2) sticking of crop cuttings which form in practice into a growing crust on the leading edge of a frame part in the region where the cutters of two adjacent driving units more backwards) can occur without being able to increase forwardly to a point where the circles described by the outermost tips of the cutters intersect, where the crust would adversely affect the mowing operation. The dimension between the leading edge of the intermediate piece and the point of intersection of the mowing circles is too large to be covered by the sticking crop cuttings, since the front portion of the crust is constantly breaking off to an extent such that bridging the gap between the leading edge of the intermediate piece and the point of intersection of the mowing circles cannot occur.

Figure 2:
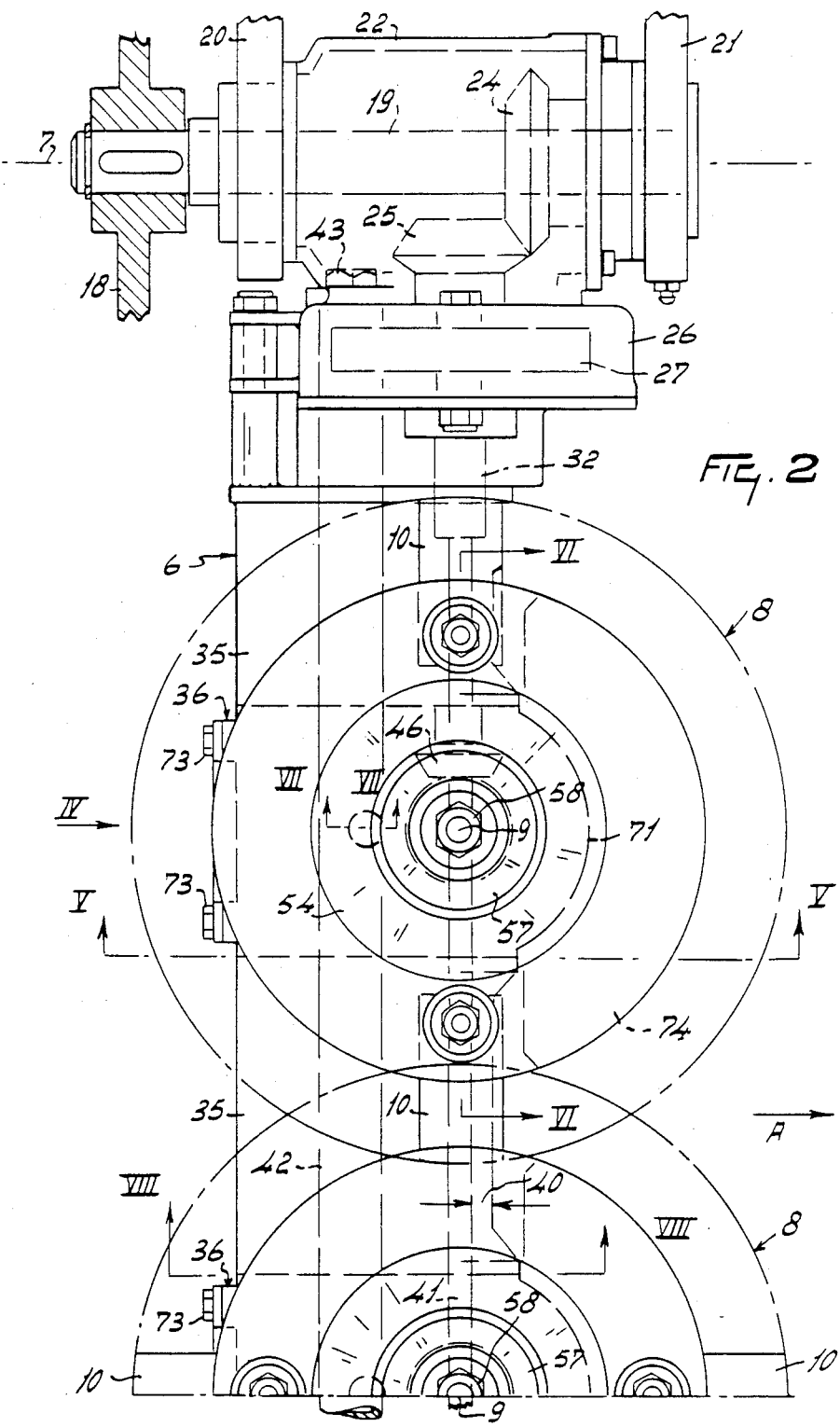
FIG. 2 is a plan view of part of the mowing machine of FIG. 1 on an enlarged scale.
Figure 5:
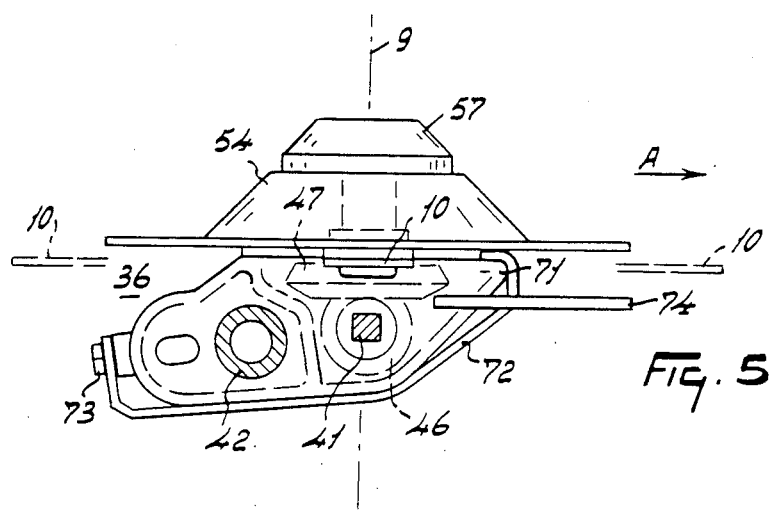
FIG. 5 is a sectional view taken on the line V—V in FIG. 2.

The tie rod 42 is shown in FIGS. 2 and 5. The tie rod 42 extends through all of the intermediate pieces and driving units and comprises a seamless, drawn, thick-walled tube. Alternatively a differently shaped tube or solid rod may be used. At the inner end of the main frame 6 the tie rod 42 is provided with a welded head 43 (FIG. 2) bearing on the surfaces of the gear box 26 directed towards the intermediate frame 4. As shown in FIG. 4, the tie rod 42 is thus located behind the axis of the gear wheel 29, with respect to the direction A. The two upwardly directed walls of the gear box 26 have holes through which the tie rod 42 passes. From FIG. 3 it will be appreciated that the outermost end of the tie rod 42 has an internal screwthread receiving a bolt 44. The head of the bolt bears on the outer surface of an end piece 45 in the form of a plate which is in contact with the outer end face of the outermost driving unit 36. The length of the tie rod 42 is such that a small space is left between its outer end and the inner surface of the end piece 45. By tightening the bolt 44 to a maximum torque of, for example, twenty-four meter kilogram the tie rod 42 is placed under tension so that it exerts, through the end piece 45, a compressive force on the intermediate pieces and driving units. The end piece 45 extends rearwardly and slopes inwardly (FIG. 3) to provide a support for a swath board for defining the outer edge of the mown swath of crop deposited behind the machine in operation. Under the action of the compressive force applied by the tie rod 42, the intermediate element 35 located nearest to the gear box 26 bears, through an intermediate ring, on the collar 30, which has an outer face that matches the contacting face of the intermediate ring.

FIG. 6 shows one of the driving units 36 clamped between two intermediate pieces 35 (see the side elevation of FIG. 8 as a whole). The main drive shaft 41 passing through all of the intermediate pieces 35 and driving units 36 is a solid shaft of non-circular cross-section. The drive shaft is preferably constructed of steel, although other suitable materials may be utilized, as is well known in the art. In the illustrated embodiment the shaft 41 has a square cross-section, but it could alternatively be rectangular, hexagonal or circular with a flat side or a key way. The sides of the square cross-section are twelve millimeters long. In each driving unit 36 the shaft 41 passes through a matching square hole in a bevel gear wheel 46, which meshes with a bevel gear wheel 47, the axes of these bevel gear wheels intersecting each other at right angles. The gear wheel 46 has 16 teeth and the gear wheel 47 has 33 teeth. A shaft 48 extends upwardly from the gear wheel 47 and has a cylindrical part 49 which is in close contact with the cylindrical inner boundary of a hub 50 of the associated cutting unit 8. The interface between the cylindrical portion 49 and the inner wall of the hub 50 thus constitutes a centering face for the position of the hub 50.

A locking ring 51 is bolted to the casting forming the housing of the driving unit 36. The locking ring 51 is also a casting and has an L-shaped radial cross-section. The inner surface of the locking ring 51 is smoothly reamed and receives two bearings 52 and 53 disposed one above the other. The inner faces of the bearings 52 and 53 support the outer surface of the lower part of the hub 50. The top part of the hub 50 has a flange extending over the upper bearing 52. The top surface of the flange serves as a supporting surface for an annular cutter holder 54, which slopes downwardly on all sides away from the outer periphery of the top part of the hub 50 and then extends as a flat ring at right angles to the centerline of the shaft 48. The flat ring carries, in this embodiment, two mowing cutters 10 disposed diametrically opposite each other. Each of the cutters 10 is fastened to the cutter holder 54 in a pivotable manner by means of a bolt which is parallel to the centerline of the shaft 48. The inner periphery of the upper and inner part of the cutter holder 54 defines a square hole which is a close fit over a raised part 55 of square shape, as viewed on plan, on the top surface of the hub 50.

The shaft 48 comprises a splined-portion located inside the hub 50 and above the cylindrical part 49. The splines cooperated with further splines in the inner periphery of the hub 50. Above the splined portion the shaft 48 has a screwthreaded portion 56. A cap 57 is fitted over the screwthreaded portion 56 to secure the central part of the cutter holder 54. The cap 57 has a recess on the underside which receives the square raised part 55 of the hub 50. A nut 58 is screwed onto the screwthreaded portion 56 to clamp the cap 57 to the cutter holder 24 and to the top surface of the hub 50.

The inner face of the lower bearing 53 bears on a shoulder 59 of the shaft 48, this shoulder constituting a centering surface which is located directly above the gear wheel 47 so that the lower bearing 53 extends deeply into the housing of the driving unit 36 so that the total height of the cutting unit can be limited, which is conducive to stability in operation. The gear wheel 46 is journalled in a bearing 60, the outer face of which is supported in the hole 37 of the casting forming the housing of the driving unit 36. On the side of the bearing 60 facing the adjacent intermediate piece 35 there is a locating ring 61 which is arranged in the hole 37 and projects from the end face of the casting. Between the bearing 60 and the locating ring 61 there is a Seeger ring (circlip) 62 located in a groove in the wall of the hole 37. A seal 63, for example, formed by an O-ring, is arranged between the outer face of the bearing 60 and the boundary of the hole 37. As viewed in FIG. 6 a bearing 60, an O-ring 63, a Seeger ring (circlip) 62 and a locating ring 61 are provided in a similar arrangement on the other side of the driving unit 36.

The gear wheel 46 is integral with a sleeve 64 extending towards the bearing 60 further from the gear wheel 46, which bearing is axially supported on a shoulder provided at the end of the sleeve 64. The Seeger rings (circlips) 62 prevent the bearing 60 from moving outwardly of the driving unit 36.

The space around the gear wheels 46 and 47 are filled with lubricant such as grease. The presence of the sleeve 64 results in the grease-filled part of the driving unit 36 being held within a closed space so that the grease cannot penetrate to the interior of the sleeve 64. Consequently, if the main drive shaft 41 is removed and the driving unit 36 is used as a separate unit, the grease cannot leave the driving unit.

In FIG. 6, the gear wheel 46 is shown on the left-hand side of the axis 9 of the shaft 48. The locating ring 61 is a sliding fit allowing movement of the ring in the unit 36 so that, when the driving unit 36 is used as a separate unit, the ring can be readily removed. After the removal of the Seeger ring (circlip) 62 the bearing 60 can also be removed, since the bearing 60 is held in place by the Seeger ring (circlip) and the sleeve 64 rather than by the fit of the bearing 60 in the housing of the driving unit. These conditions also apply to the centering ring 61, the Seeger ring (circlip) 62 and the bearing 60 on the right-hand side in FIG. 6. This means that the gear wheel 46 and the sleeve 64 can be removed and replaced the other way round, the gear wheel 46 then being on the right-hand side, as viewed in FIG. 6 so that it engages the opposite side of the gear wheel 47. When the main drive shaft 41 is driven in the same direction as before, the cutting unit 8 is driven in the opposite direction of rotation.

Since the lubricant contained in the driving unit 36 is confined in a closed space, it is necessary to provide vent means shown in FIG. 7. A holder 65 is screwed into a tapped hole in the locking ring 51. The holder 65 has a bore communicating with the space around the gear wheels 46 and 47. The bore contains a compression spring 66. On the underside the compression spring 66 bears on the top side of a plunger 67, the underside of which bears on a shoulder in the continuous bore in the holder 65. At the top the holder 65 has a discontinuous collar 68 below which there is a second discontinuous collar 69, which bears on the locking ring 51 in the mounted state. The top end of the spring 66 is in contact with the underside of a cap 70 of readily deformable material such as brass which is fitted over the upper collar 68 and crimped, by means of pincers, in the region between the two collars 68 and 69. The cap 70 is crimped only on two opposite sides, and consequently between the crimped parts the cap is slightly deformed outwardly so that an aperture is formed extending from the bore of the holder 65 along the discontinuous collar 68 to the region between the two collars and thence to the open air. The spring 66 normally holds the flap 67 closed, but when heat is developed inside the driving unit 36 the lubricant, which then tends to expand, can lift the flap 67 and escape through an aperture 67A to the bore of the holder 65 and along the path described above. The escaping lubricant is in general formed by a mixture of air and grease particles. After the cutter holder 54 is removed, the holder 65 can be unscrewed and, if necessary, the driving unit may be replenished with grease through the opening thus formed.

From FIGS. 2 and 8 it will be appreciated that, viewed in the direction of movement A, the leading edges of the tops of the driving units are located in front of the leading edges of the adjacent intermediate pieces 35. This is a consequence of the shaft 48 of the cutting unit 8 of each of the driving units being placed as far forward as possible with respect to the neighboring intermediate pieces in order to obtain, in the opposite direction of rotation of the cutting units 8, an overlap of the cutters located as far as possible in front of the leading edge of the adjacent intermediate piece 35. An additional consideration, as referred to above, is the effect of a growth of a layer of crop cuttings settling on the leading edge of the intermediate piece. In FIG. 2 the leading edges of the top parts of the housings of the driving units 36 protruding in front of the leading edges of the intermediate pieces are designated by reference numeral 71. Viewed on plan in FIG. 2 the leading edge of each driving unit is arcuate and subtends an angle of about 150° or more in front of the leading edge of the adjacent intermediate piece. From the leading edge 71, the front wall of each driving unit is inclined downwards from the front to rear and adjoins on the underside the underside of the driving unit (FIG. 8).

Each driving unit 36 comprises a releasable shoe 72, the shape of which, in side view, generally follows the form of the front, underneath and rear surfaces of the housing of the driving unit (FIG. 5). The shoe 72 fits around the leading edge 71 of the driving unit and then slopes downwards and rearwards; subsequently it extends over the bottom face of the housing and curves upwardly behind the rear wall of the housing. This shoe 72 is fastened to the housing only at the rear by two bolts 73. The shoe 72 not only provides a sliding and wear-resistant surface for the driving unit (the bottom face of each adjacent intermediate piece 35 is located above the ground as can be seen, for example, from FIGS. 4 and 6), but also enables a protecting plate 74 (FIG. 5), to be rigidly secured to the front of the shoe 72. The protective plate 74 is fastened at a distance of about two to three centimeters, preferably about 2.5 centimeters, below the outer edge of the cutter holder 54 and extends parallel to the outer edge of the cutter holder 54. The width of the protective plate 74, measured in the direction B (FIG. 4), is substantially equal to that of the driving unit and, viewed on plan, the outer boundary of the plate 74 approximately corresponds with that of the outer edge of the cutter holder 54. The plate 74 protects the cutting unit 8 from stones and other objects which might otherwise penetrate below the cutters 10 to the driving unit and damage the cutting unit 8 by an upward movement.

The main drive shaft 41 of the mower is made from a single length of material and extends from the collar 30 of the gear box 26 to the outer side of the outermost driving unit. This shaft is comparatively very thin and this thinness of the shaft appreciably contributes to the low value of the dimension 40 in FIG. 2. The polar moment of resistance of the main driving shaft 41 amounts to about 0.36 cm$^3$ and transfers in normal operation a power of about thirty horsepower (twenty-two kilowatts) with a torsional moment of about 230 centimeter kilograms (2220 Ncm). This comparatively low torsional moment and the consequent small diameter of the main drive shaft 41 can be attained by driving the shaft 41 at a comparatively high speed of revolution. At a speed of the power take-off shaft of the tractor of 540 rev/min the shaft 19 is driven, in the illustrated embodiment, at a speed of 1380 rev/min owing to the ratio between the diameters of the pulleys 17 and 18. The transmission ratio between the gear wheels 24 and 25 (twenty-three and fifteen teeth respectively) and the transmission ratio between the gear wheels 27, 28 and 29 (seventy-seven, seventy-seven and seventeen teeth respectively) provide a speed of the drive shaft 41 of about 9500 rev/min. Owing to the transmission ratio between the gear wheels 46 and 47 (sixteen and thirty-three teeth respectively), the speed of each shaft 48 (and hence of each cutting unit 8) will be about 4600 rev/min. The speed of revolution of the input shaft 16 of the machine is thus first converted into the high value of the speed of the shaft 41 and then reduced. Depending on the diameter of the circle described by the tips of the cutters 10 (for example, about thirty centimeters for adjacent cutting units 8 rotating in the same direction and thirty-five centimeters or more for adjacent cutting units rotating in opposite directions) the tips of the cutters move at about seventy to eighty-five meters per second.

An important advantage of the comparatively thin main drive shaft 41 is that, during operation, this shaft can withstand an appreciable torsional deformation, that is, twist. With an overall length of the shaft 41 of one hundred, sixty-five centimeters the angular displacement between the ends of the shaft is slightly more than 9° in normal operation. The total permissible angular displacement between the ends of the shaft is about 45° before the yield point of the material is reached. The capacity of the shaft 41 to withstand torsional deformation enables external forces exerted on the cutting units by impact with obstacles such as stones and the like to be absorbed without resulting in damage to the machine. The safety factor up to the yield point of the shaft 41 is approximately five. Also in the case of a jolting start and running down of the rotating cutting units the capacity of the shaft 41 to withstand torsional deformation is important.

Figure 3:
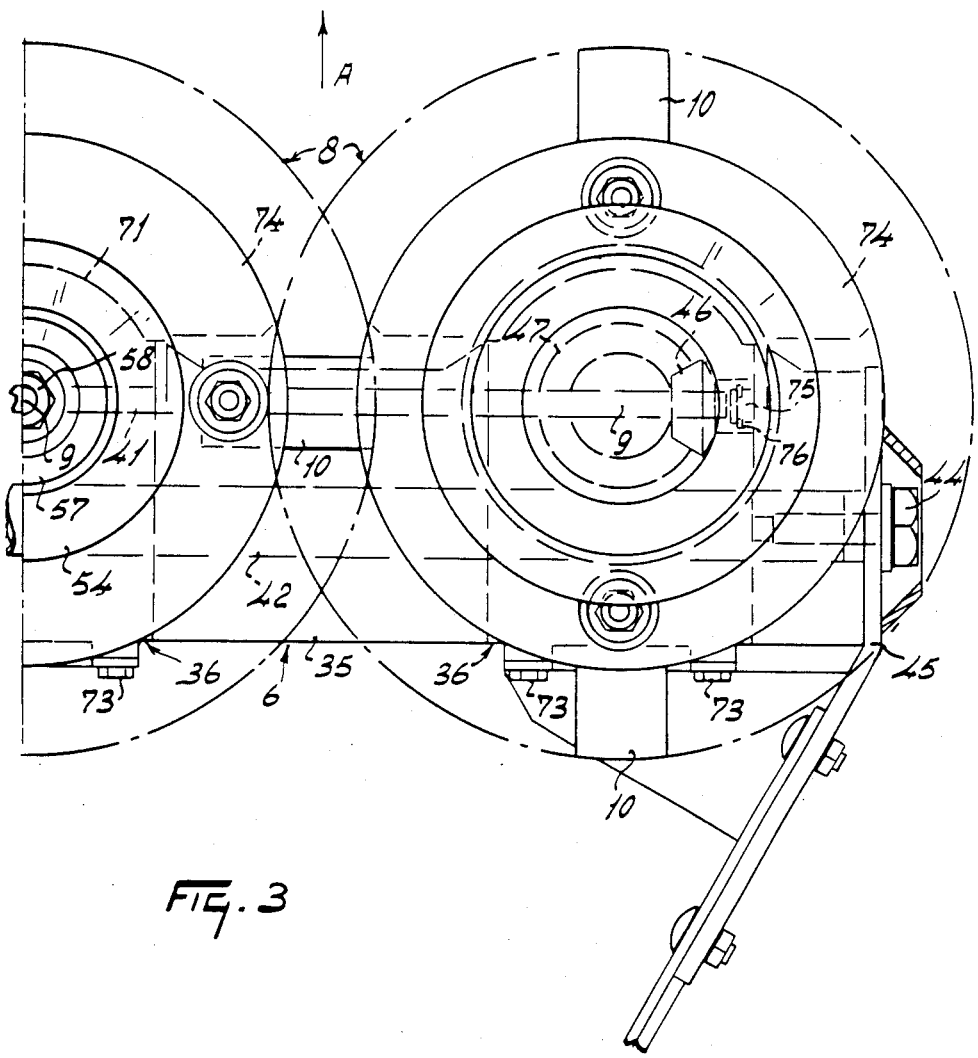
FIG. 3 is a plan view of a further part of the mowing machine of FIG. 1 on an enlarged scale.

As shown in FIG. 6, each gear wheel 46 has a cylindrical cavity 75 which opens to the outside on the side facing the outer side of the driving unit. The cylindrical wall of the cavity 75 has a continuous groove 76. The cavity 75 and the groove 76 are only used in the outermost driving unit 46 as is shown in FIG. 3. In this outermost driving unit the gear wheel 46 is arranged on that side of the driving unit which is farthest from the gear box 26, since the cutter 10 driven by this driving unit have to move inwardly at the front of the machine. The cavity 75 is, therefore, open to the outside. The continuous groove 76 can receive a Seeger ring (circlip) which provides a stop in outward direction for the adjacent end of the main drive shaft 41. The inner end of the shaft 41 is located by abutment with the supporting plate 34 mentioned above with reference to FIG. 4. In this way the shaft 41 is prevented from moving axially (except for a small clearance) and it is retained axially by stops which rotate with the shaft so that they do not give rise to wear.

The cutting unit 8 arranged on the outermost driving unit 36 (that is to say at the free end of the main frame 6) is preferably provided with a differently shaped cutter holder 54 and hub 50, the cutter holder 54 measured in a vertical direction being appreciably higher than the cutter holders shown in FIGS. 4 and 6, that is to say, preferably 2 to 4 times higher than the cutter holders shown. The general design may be the same, i.e. an upwardly converging truncated cone. The reason for this is that the outermost cutter holder 54, the front side of which moves inwardly, contributes to the establishment of the lateral edge of the mown swath. The hub 50 is also higher, while the same cap 57 can be used as in the other cutter holders.

When viewed in a horizontal direction and in the direction A (FIGS. 4 and 6), the top face of each intermediate piece 35 is located at a distance (1.5 to 2.5 centimeters) below the bottom face of the locking ring 51 of the adjacent driving units 36 in order to minimize any hindrance of the passage of mown crop to the rear over and across the intermediate pieces. The distance between the top side of the part of the main drive shaft 41 in each intermediate piece 35 and the top face of the intermediate piece itself is mainly occupied by the wall thickness of the intermediate piece 35. This is another advantage of the small diameter of the main drive shaft 41 allowed by the comparatively high speed of rotation of this shaft.

As stated above the cutters 10 (two of which are shown on each cutting unit 8) are arranged on the outer, lower rim of the cutter holder 54 so as to be freely pivotable at their inner ends about a pivotal axis parallel to the axis 9. The cutters 10 have a twisted form so that, with respect to the direction of rotation, the leading edge of each cutter is at a lower level than the trailing edge.

The mowing machine described may be assembled in various ways in accordance with the user's needs. The intermediate pieces 35 and the driving units 36 (on which the cutting units are or will be mounted) are alternately mounted on the tie rod 42, for example, first an intermediate piece 35, using the associated holes 38 (through which passes the tie rod 42), then a driving unit 36 (also using the holes 38), then another intermediate piece 35, and so on until the desired number of driving units and cutting units 8 is attained. The tubular tie rod 42 is preferably a close fit in the holes 36 (FIGS. 5 and 8), but this is not essential. In assembling the intermediate pieces and driving units the location of these components relative to each other is ensured by the locating rings 61 (FIG. 6) each abutting the Seeger ring (circlip) 62 of the adjacent driving unit and abutting a shoulder in the adjacent intermediate piece. Such a shoulder is also provided in the collar 30 of the gear box 26 (FIG. 4). By means of these locating rings 61 the relative positions of the intermediate pieces and the driving units as well as of the first intermediate piece and the collar 30 are accurately established. Since the contacting faces of the intermediate pieces and the driving units are smooth, relative rotation of these components might occur, but this is prevented by the presence of the tie rod 42 at a distance behind the locating rings 61 and by the high compressive force exerted by the tie rod on the intermediate pieces and the driving units, this force being satisfactorily absorbed by the cast-iron housings of the intermediate pieces and driving units, it is advisable to pass the main drive shaft 41 beforehand through a number of intermediate pieces and driving units; the end of the shaft 41 may be bevelled to make its insertion easier. The shaft 41 accurately fits in the square hole in each gear wheel 46. In this way shaft 41 can be readily passed through the intermediate pieces and driving units.

A first possibility of varying the characteristics of the mowing machine is to use intermediate pieces 35 of different lengths, measured in the direction B. It is also possible to use intermediate pieces 35 of equal lengths and to vary the distances between the driving units by arranging filling pieces at the ends of the intermediate pieces. In this manner the distance between the rotary axes 9 of the cutting units 8 can be varied. This may be determined by the choice of the directions of rotation of neighboring cutting units 8. Two adjacent cutting elements having the same sense of rotation have cutters whose paths must not overlap to any appreciable extent. If a standard length of the cutter is used, the length of the intermediate piece located between the driving units concerned is chosen to be larger than in other cases. Alternatively, the length of the intermediate piece may remain the same, but then shorter cutters must be used. When two adjacent driving units rotate in opposite directions, the cutters can overlap considerably in accordance with the desired local mowing effect. When the standard length of the cutters of the last-mentioned cutting elements is used a shorter intermediate piece 35 may be used between the two driving units, or, if comparatively long cutters are employed, the intermediate piece can be of standard length. Otherwise if larger diameters of some or all cutting elements and larger diameters of the circles described by the cutter tips are desired, longer intermediate pieces 35 have to be used so that higher cutting speeds of the cutters can be attained. Then cutter holders 54 of larger diameter are used; in their central parts they have the same square recesses receiving the square elevated part 55. The later possibility thus provides a second variation is assembling the mowing machine.

It is also possible to select the direction of rotation of each cutting unit 8. As stated above with reference to FIG. 6 the gear wheel 46 together with its integral sleeve 64 can be taken out of the driving unit 36 by removing the locating ring 61, the Seeger ring (circlip) 62 and the bearing 60. FIG. 6 shows the gear wheel on the left-hand side of the housing of the driving unit; this disposition determines the direction of rotation. When the removed parts 46 and 64 are inserted from the right-hand side of the housing so that the gear wheel 46 engages the right-hand side of the gear wheel 47, the cutting unit mounted on the driving unit will be driven in the opposite direction of rotation. For this purpose the end of the sleeve 64 away from the gear wheel 46 is moved to the right-hand side of the housing of the driving unit and the shoulder-like part is caused to bear on the inner race of the bearing 60 on the left-hand side. Then on the right-hand side the bearing 60 is inserted, to abut the shoulder near the cavity 75. Finally the Seeger ring (circlip) 62 is inserted at the right-hand side and the locating ring 61 is fitted so as to locate the intermediate piece on the right-hand side. These operations are simple to carry out not only by the manufacturer of the machine but even by a dealer or the user himself. Of course driving units having existing dispositions of gear wheel 46 relative to gear wheel 47 can be threaded in a different order of succession onto the tie rod 42.

The mowing machine described can thus be modified to vary not only the distance between the rotary axes of the cutting units but also the diameters of the circles described by the tips of the cutters and the relative directions of rotation of adjacent cutting units. When assembling the mowing machine in the manner described above, attention should, of course, be paid to the relative directions of rotation of the cutters, as viewed on plan. The cutters of two adjacent cutting units will, in general, be disposed so that they are out of phase by a right angle with respect to one another. It is important for the numbers of teeth of the gear wheels 46 and 47 of each driving unit to have a given ratio. The ratio between the numbers of teeth of the gear wheels 47 and 46 need not be an integer, but should preferably be slightly higher or lower than an integer. In the embodiment described the gear wheel 47 has thirty-three teeth and the gear wheel 46 has sixteen teeth. When a driving unit is slipped from the right-hand end onto the drive shaft 41 (so fixing the square elevated part 55 with respect to the length of the shaft 41) and subsequently an intermediate piece 35 is mounted on the shaft, the shaft 48 of the next driving unit can be turned by hand before it is slipped onto the shaft 41 until the square part 55 and the square recess in the gear wheel 46 have the same positions as those of the driving unit already mounted. Owing to the aforesaid ratio between the numbers of teeth of the gear wheels 46 and 47 a few turns of the shaft 48 will be sufficient to cause both the square elevation 55 and the square recess in the gear wheel 46 to be in the same positions as those of the driving unit already mounted. Afterwards the cutter holder 54 is fitted on the square part 55 in a manner such that the associated cutters are out of phase by a right angle with respect to those of the driving unit slipped on previously.

Apart from the aforesaid advantages of the integral drive shaft 41, such a construction is preferred over an assembly of shaft portions for other reasons. For example, the individual portions of a composite shaft would have to be coupled together by coupling pieces (for example with a splined connection between the shaft portions and the coupling pieces) so that during operation due to the varying torsional moment in the shaft the shaft portions tend to "bite" the coupling pieces.

Preferably the drive shaft 41 is subjected to a surface treatment to avoid corrosion of the shaft surface; otherwise the passage of the square recesses in the gear wheels 46 of the driving units over the shaft might become difficult. Such as surface treatment may be cadmium- or chromium-plating or the like.

As viewed from the side (FIG. 8) the top face of each intermediate piece 35 slopes upwardly from front to rear (see the dashed line 77 representing the front portion of the top face and the solid line 78 representing the rear portion; the solid line located above the dashed line 77 represents an integrally cast ear of the casting near the two ends of the intermediate piece 35, as is also shown, for example, in FIG. 4). Crop passing across the top face of the intermediate piece to the rear, when the intermediate piece is located, for example, between two cutting units 8 rotating in opposite directions, is guided by the upward slope of the rear part 78 in upwardly and rearwardly inclined direction as a result of which the crop is airily deposited on the ground.

FIG. 9 schematically shows a number of cutting units 8, which have been assembled in the manner described above to give a desired sequence of the various relative distances between the neighboring rotary axes 9 and for the directions of rotation of the cutting units. The three cutting units on the left-hand side of FIG. 9 all rotate in the same sense i.e. clockwise, while the three cutting units on the right-hand side of the machine all rotate in the opposite direction; i.e. counter-clockwise.

The mown crop is conveyed from the two ends of the row of cutting units towards the center of the machine and is deposited to the rear over and across the respective intermediate piece 35 in the form of a swath by two central cutting units which rotate in opposite directions. In this embodiment all the mown crop is passed between only two cutting units so that it is useful in this case for the intermediate piece arranged between the two cutting units driven in opposite senses to be relatively long compared with the other intermediate pieces 35, or for auxiliary pieces to be provided. The embodiment shown in FIG. 9 is only given by way of example, and the relative dispositions may be different. For example, on the left-hand side there could be two cutting units rotating clockwise, the other four cutting units rotating counterclockwise, but many other combinations of directions of rotation and relative distances are also possible. In the embodiment shown in FIGS. 1 and 9 the mowing machine comprises six cutting units 8 each having a mowing circle of thirty centimeters diameter, when rotating in the same direction, and of thirty-five centimeters diameter when rotating in opposite directions, the distance between the rotary axes 9 being about thirty centimeters and the overall cutting width being 1.8 meters. The length of the main drive shaft 41 is in this case about one hundred, sixty-five centimeters. For two adjacent driving units 36 rotating in the same direction, the distance between the gear wheels 46 is then, of course, also thirty centimeters. For two driving units driven in opposite directions, the distance between the associated gear wheels 46 is about thirty-eight centimeters, since the gear wheel 46 of one of the two driving units (FIG. 6) is put at the right-hand side of the driving unit in its mirror-image position. This means that torsional deformation of the shaft length between the gear wheels 46 of the driving units driven in opposite senses is greater and hence there is more rotational or torsional resilience than between the units driven in the same sense so that jolting loads occurring particularly in driving units driven in opposite directions (as in middle of FIG. 9) can be better absorbed.

The FIGS. 10-14 show other embodiments of the cutting units 8 provided on the shafts 48. In the embodiment of the FIGS. 10 and 11 a cutting holder 86 being provided on the square raised part 55 whereby the square raised part 55 lies with close fit in a square hole in the cutter carrier 82 made from strip material, preferably spring steel. From the area around the square recess fitting around the raised part 55 the cutter carrier 82 is bent on both sides of the center line 9 in a downwardly and outwardly inclined position and terminals on both sides in a part 83 of the cutter carrier 82 which is perpendicular to the center line 9. Near the two ends of the parts 83 of the cutter carrier 82 holes are provided for passing fastening parts 84 of the mowing cutters 10 so that the two cutters 10 are located below the ends of the cutter carrier 82. Viewed on plan (broken lines in FIG. 10) each cutter carrier 82 is outwardly tapering away from its inner part, while the two cutter fastening areas are located diametrically opposite one another.

Figure 11:
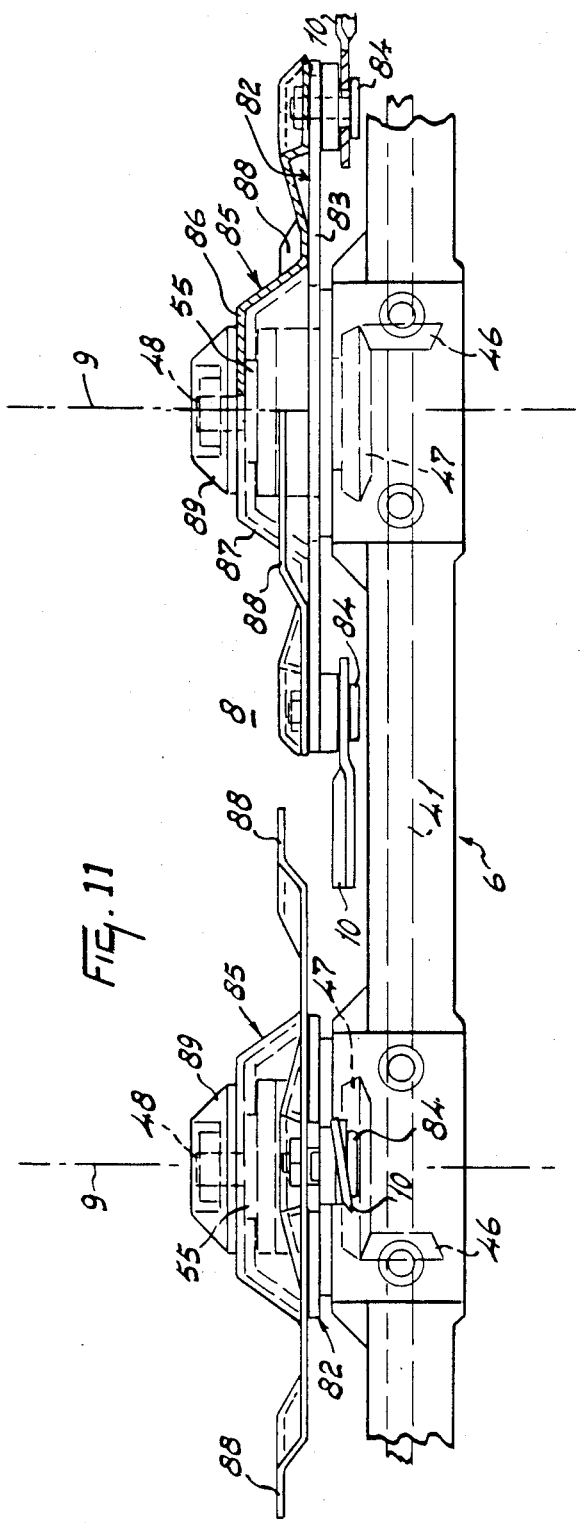
FIG. 11 is a horizontal rear view of the part of the machine shown in FIG. 10, the cutting units being shown partly in an elevational view and partly in a sectional view.

Above the cutter carrier 82 is located a disc-shaped hood 85. Viewed on plan (FIG. 10) each hood 85 has, at least in this embodiment, a substantially circular shape. The upper and inner part 86 of the hood 85 is directly bearing on the top and inner part of the cutter carrier 82 located around the square raised part 55. At its circular outer edge the part 86 terminates in a frustoconical part 87, a portion of which is in contact with the top and outer side of the downwardly bent-over part of the cutter carrier 82. The top of the cone is located above the cutting unit and on the center line 9, while its axis coincides with said center line. The conical part 87 is prolonged to the plane coinciding with the top side of the part 82 of the cutter carrier 82 and is upwardly inclined, viewed in the outward direction, away from the latter part located at a distance from the outer edge, at an angle of about 10° to 20° to be higher than the fastening parts 84, outside of which inclination it is downwardly directed to below the nut of the fastening parts 84 so as to be coupled with the cutter carrier as seen in FIGS. 10 and 11. The hood 85 terminates near or slightly beyond and at the side of the imaginary circle going through the outer boundary of the knife carrier 82.

The hood 85 may be constructed in the form of a rotational-symmetrical body, but as an alternative it may have the upward inclination shown in FIG. 11 and described in the foregoing exclusively at the place of the cutter connection 84 and, in addition, a similar vault in the area of a part of the periphery which is turned through 90° with respect to the vaulting near the cutter connection, whereas the hood portions lying between said four vaults are perpendicular to the center line 9. The upward vaults located between the cutter connections are designated in FIGS. 10 and 11 by reference numeral 88.

The inner part of the cutter carrier 84 and the directly superjacent inner part 86 of the hood 85 are both clamped to the subjacent bearing of the cutting unit by means of a locking piece 89 having inner screwthread and being screwed onto the screwthreaded top end 56 of the rotary shaft 48.

In this embodiment the hood 85 may be made from a thin metal sheet, for example, steel, more particularly spring steel of a thickness of about 0.5 to 1.5 millimeters.

The deposition of the cutting carriers 82 and the associated hoods 85 of two neighboring cutting units is such that the cutting carriers (and, of course, also the associated hoods 85) are out of phase by an angle of 90° with respect to one another. From FIG. 10 it will be apparent that a cutter 10 of one of the two cutting units of a pair rotating in opposite senses passes below the vault 88 of the hood 85 of the other cutting unit of said pair. If the hoods 85 have a rotation-symmetrical structure, as stated above, a cutter 10 of one cutting unit moves below the hood 85 of the other cutting unit during part of its path. The paths covered by the outermost ends of the cutters 10 of a pair of cutting units rotating in opposite senses overlap one another. The distance between the cutting connections 84 of the cutting units is in this embodiment about twenty-five to fifth centimeters, preferably about thirty centimeters. In this embodiment the diameter of the path described by the outermost ends of the cutters is forty to seventy-five centimeters, preferably about fifty centimeters.

The cutters 10 have a slightly twisted structure in this embodiment such that, viewed in the direction of rotation c, the cutting edge of each cutter 10 is at a lower level than the rear side of the cutter so that the cut crop is thrown upwards by the cutter. The crop thus arrives on the rotating hoods 85 of the cutting units. The rapidly rotating hoods carry the crop across their surfaces into the region between the center lines of a pair of oppositely rotating cutting members and further in rearward direction. The cutters 10 are freely pivotable about pivotal axes substantially parallel to the rotary shafts 9 and formed by the fastening parts 84. The fastening parts 84, are moreover, constructed so that during operation each cutter 10 can slightly move up and down.

If hard objects such as stones are found on the field to be mown, these objects are passed frequently over the main frame 6 (FIG. 11), mainly in the region where the cutters 10 of a pair of oppositely rotating cutting units rotate to the rear. Therefore, these objects have to wiggle in between the top side of the main frame 6 and the underside of the hoods 85. When the hoods 85 have a flexible structure, they are capable of bulging upwardly and to a allow the object to pass, after which the hood can regain its initial shape without damage to the machine. In the embodiment shown in FIGS. 10 and 11 this possibility is in particular offered by the region below a hood 85 not covered by the associated cutter carrier 82.

Since the hood 85 is clamped tight near the inner and upper parts by the locking piece 89 and since the sheet material is thin, great elasticity of the hood in an upward direction is obtained.

It is noted here that the outermost parts of the hood extending beyond the frustoconical part 87 are slightly curved upwards in outward direction. Owing to the high speed of rotation of the cutting units the centrifugal forces acting on this part of the hood 85 are relatively heavy and tend to turn this part of the hood downwards. This effect provides, so to say, an additional stiffness of the hood so that the hood may have a relatively thin structure and can resist comparatively large deformations without being permanently deformed.

The embodiment shown in FIGS. 12, 13 and 14 having the same design of drive, frame and cutting carrier as in FIGS. 10 and 11 (said parts are designated by the same reference numerals) comprises a different structure of the hood, which is designated here by reference numeral 90.

The hood 90 has an inner part 91 in the form of a truncated cone being in engagement with the downwardly extending part of the cutter carrier 82. This part 91 terminates near the top side of said downwardly extending part of the cutter carrier 82. At a distance above the inner region of the part 83 of the cutter carrier the part 91 goes over into a downwardly inclined part 92 (viewed in section at an angle of about 5° to 20° to a plane perpendicular to the center line 9), which extends over and beyond the cutter fastening part 84 and beyond the outer boundary of the cutter carrier 83, where it terminates in a downwardly bent-over rim 93 which—as viewed in the sectional view of FIG. 13—is at an angle of about 40° to 70° to a plane perpendicular to the center line 9. The lower boundary of the rim 93 is located with some amount of clearance about the highest boundary of the cutters 10.

The hood 90 has a rotation-symmetrical structure and has a sectional area as shown in FIG. 13.

The hood 90 may be made from wear-resistant synthetic resin or rubber-like material provided on its top side with a wear-resistant layer. In the material of the hood 90 is preferably arranged a reinforcement in the form of a plurality of endless reinforcing bars or wires 94 concentric with the center line 9 while near the lower boundary of the rim 93 a relatively rigid, strong reinforcement 95 is provided in said rim also in the form of an endless member coaxial with the center line 9. The reinforcement 95 like the reinforcing bars or wires 94 may consist of steel wire and/or a material such as glass fiber. Although this is not indicated in the drawings the hood 90 having the form of an inverted dish without bottom may be provided with reinforcing bars or wires radially directed as viewed in a direction parallel to the center line 9 and covering the whole radial dimension.

For securing the hood 90 to the downwardly extending inner part of the cutter carrier 82 a plurality of rectangular openings 96 are provided in said downwardly extending part, whereas near the upper boundary of the conical part 91 of the hood 90 inwardly extending bulging parts 97 are provided, which are located in the openings 96 of the cutting carrier 82 when the hood 90 is mounted. The hood 90 can be put in place without the need for tools by pressing the part 91 from above to the downwardly extending part of the cutting carrier, while the material near and between the bulging parts initially yields slightly until these bulging parts snap into the openings 96 so that the hood 90 is fixed with respect to the cutting carrier. The hood 90 can be disengaged by lifting the hood near the outer rim and/or by turning it so that such a deformation of the part 91 can be obtained that the bulging parts 97 snap out of the openings 96.

As stated above, heavy centrifugal forces occur during operation. These centrifugal forces tend to move upwards the downwardly inclined parts 92 and 93 of the hood 90. This is prevented to a considerable extent by the presence of the reinforcing bar 95, which is exposed to tensile stress, which prevents a further upward deformation. In this way it is ensured that despite comparatively slack material sufficient rigidity is obtained for the crop conveying function of the hood 90. If a hard object passes below the hood 90 and above the frame 6, the flexibility of the hood is, however, sufficient to cause the hood to deform so that the object can pass by without being jammed and without causing damage. The hood will locally deform in upward direction, whereas the opposite part of the hood will move slightly downwards. If the passing object is relatively large and if the flexibility of the hood appears to be insufficient, the nature of the fixation of the hood with the aid of the bulging parts 97 and the openings 96 (quick-action joint) is advantageous in that the whole hood is lifted from the cutter carrier and is disengaged from the machine. This does not give rise to danger to the surroundings because the hood is made of very light-weight material and will not be slung away as a whole in a given direction like disengaging cutters. Moreover a screen is fastened to the framework 13. As a matter of course, the hood 40 may be rigidly secured to the inner part of the cutter carrier by means of bolts or screws.

The two embodiments of the hood are not unrelated. In the embodiment in thin metal as shown in FIGS. 10 and 11 the design of the embodiment of FIGS. 12, 13 and 14 can be used and for the synthetic resin or rubber structure of FIGS. 12 and 13 the design of FIGS. 10 and 11 may be used. Moreover, the fastening modes in these two embodiments may be interchanged. It is furthermore noted that in the two embodiments the hood 85 and 90 respectively need not be rotation-symmetrical; it may be elliptical or substantially elliptical as is shown in FIG. 12 by broken lines (reference numeral 98).

If the general construction of the mowing machine permits, flexible hoods having as the case may be, only a screening function may be arranged below the cutter carrier 82 and the cutting fixation.

With regard to the embodiments of the hood 90 it is furthermore noted that the hoods may be coupled with the cutter carrier by the connection members 84, which contributes to the rigidity of the part of the flexible hood lying beyond said regions in a vertical sense. Moreover the embodiment described of the flexible hoods are independent of the number of cutters per cutting unit and also of the kind of cutting effect of the cutter; for example, the flexible hood may be used above or below a cutter or a cutting edge co-operating with a rotatable or non-rotatable counter-knife. Finally, if the construction of the machine permits, the flexible hood may be arranged in a non-rotatable manner.

The construction of the cutting units with the flexible hood 85 or 90 is very useful in combination with the construction of the main frame 6 and the drive shaft 41. The construction of the flexible hoods may, however, also be applied to mowing machines in which the driving gear is located above the cutting units, for example, drum mowers and also to machines in which the driving members are located both below and above the cutting units. The invention may furthermore be applied to mowing machines of a different kind of agricultural machines such as combines and pick-up wagons equipped with cutting units.

The mowing machine described is particularly suitable for being hitched not only to the rear lift of a tractor but also to a front lift, in which case the gear box 26 need only be arranged in a mirror-image position with respect to a plane at right angles to the plane of the drawing in FIG. 4 (particularly the collar 30). A required change of direction of rotation of the cutting elements can be carried out in the manner described above. The mowing machine is particularly intended to mow agricultural crop, for example, grass and clover.

Although various features of the mowing machine described and illustrated in the drawings, will be set forth in the following claims as inventive features, the invention is not necessarily limited to these features and is intended to encompass inventive features disclosed both individually and in various combinations.

Having disclosed our invention, what we claim as new and to be secured by Letters Patent of the United States is:

1. A mowing machine comprising:
   an elongated main frame, said main frame further comprising a plurality of longitudinally spaced driving units;
   cutting units driven by said driving units comprising rotating wheel means adapted to drive a corresponding said cutting unit;
   an elongated, narrow, integrally formed, single-piece, continuous main drive shaft with a non-circular cross-section passing through said main frame drivingly engaging each said wheel means, said drive shaft having a speed of rotation at least double that of said rotating wheel means;
   and means for driving said drive shaft at a high speed of revolution, said drive shaft's thin structure being the means for reducing the height of said cutting unit above the ground, recessing the leading edge of portions of said mainframe between said driving units such that crop buildup does not interfere with mowing effectiveness, and together with said high speed of revolution performing the function of absorbing the forces introduced by said cutting units striking solid obstacles such that damage to the machine does not occur when said drive shaft is rotating at said high speed of rotation.

2. A mowing machine as claimed in claim 1, wherein said drive shaft is capable of withstanding up to about 28° angular displacement per meter length before the yield point of its material is reached.

3. A mowing machine as claimed in claim 2 wherein said drive shaft has a polygonal cross section.

4. A mowing machine as claimed in claim 2 wherein said drive shaft has a square cross section.

5. A mowing machine as claimed in claim 2 wherein said cutting units each comprise rotating cutters, the outer tips of said cutters circumscribing a circle having a diameter of about thirty to thirty-five centimeters.

6. A mowing machine as claimed in claim 5 wherein said drive shaft has a thickness of about twelve millimeters and said cutter tips of said cutters move at about seventy to eighty-five meters per second.

7. A mowing machine as claimed in claim 6 wherein said drive shaft rotates at about 9500° revolutions per minute and said wheel means rotate at about 4600 revolutions per minute.

8. A mowing machine as claimed in claim 2 wherein said drive shaft transfers in normal operations to said cutter units about thirty horsepower.

9. A mowing machine as claimed in claim 9 wherein said drive shaft's angular rotational displacement in normal operations is about 5.5° per meter.

10. A mowing machine as claimed in claim 9 wherein said drive shaft is about 165 centimeters in length and its angular rotational displacement between its ends is about 9°.

11. A mowing machine which comprises main frame means supporting a plurality of longitudinally spaced cutter driving units, each said cutter driving unit comprising first and second gear means which are so constructed and arranged that said first gear means drives said second gear means at revolutions per minute which are at least fifty percent less than the revolutions per minute of said first gear means, a continuous integrally formed single-piece main drive shaft with a non-circular cross-section passing through said main frame and directly received by each said first gear means to rotate same, said second gear means rotating said cutters, said drive shaft having a uniformly small cross-section throughout said shaft's length such that said drive shaft is capable of absorbing without breaking in response to external forces exerted on said cutters by striking obstacles such as a stone or the like and without damaging the machine.

12. A mowing machine as claimed in claim 11 wherein said drive shaft is capable of withstanding up to about 28° angular rotational displacement per meter length before the yield point of its material is reached.

13. A mowing machine as claimed in claim 12 wherein said drive shaft's angular rotational displacement in normal operations is about 5.5° per meter.

14. A mowing machine as claimed in claim 13 wherein said first gear means comprises a first bevel gear and said second gear means comprises a second bevel gear meshing with said first bevel gear.

15. A mowing machine as claimed in claim 14 wherein said drive shaft in normal operations rotates at about 9500 revolutions per minute and said cutters rotate at about 4600 revolutions per minute.

16. A mowing machine as claimed in claim 15 wherein said cutters move at about seventy to eighty-five meters per second in normal operations.

17. A mowing machine as claimed in claim 12 wherein said drive shaft has a square cross section.

18. A mowing machine which comprises:
a main frame supporting a plurality of longitudinally spaced apart driving units, each said driving unit rotating a cutting unit provided with an outwardly extending cutter which rotates about an upwardly extending axis, each said driving unit comprising first and second gear means which are so constructed and connected that said first gear means drives said second gear means at an rpm which is not more than one-half of said first gear means' rpm; an elongated, continuous single-piece, uniformly small non-circular cross-sectional area main drive shaft for directly driving all of said first gear means so that the outer tips of said cutters are disposed at a distance relative to said axis and each moves at an operating speed of about 70 to 85 meters per second when said main drive shaft is rotated at about 9500 rpm; and rpm increasing means for driving said main drive shaft about said 9500 rpm from a tractor's PTO having a normal operating rpm of about 540.

19. A mowing machine which comprises:
a hollow main frame which is operatively disposed proximate to the underlying ground;
a plurality of longitudinally spaced apart driving units supported by said main frame;
rotating cutting units driven by said driving units via gears;
an elongated, relatively narrow, continuous, integral one piece main drive shaft means composed of material capable of withstanding substantial torsional deformation drivingly engaging each said driving unit and having the same uniformly small non-circular cross-section over its whole length, said drive shaft means received in said main frame;
means for driving said shaft means at a high speed of revolution, said means comprising gears constructed and arranged so that said high speed of revolution is at least about double the speed of rotation of said rotating cutting units, said drive shaft means revolving at said high speed performing the function of resiliently withstanding external forces acting an said cutting units caused by striking obstacles such as stones or the like without damaging the machine.

20. A mowing machine as claimed in claim 19 wherein said gears comprise two bevel gears, the diameter of one said bevel gear being not more than about fifty percent of the diameter of other said bevel gear, said one bevel gear being mounted in said main frame.

21. A mowing machine which comprises:
a main frame means that is operatively disposed generally horizontally and proximate to the underlying soil and which supports a plurality of longitudinally spaced apart cutter driving units, each said cutter driving unit comprising first and second gear means which are so constructed and arranged that said first gear means drives said second gear means at revolutions per minute of said first gear means;
an elongated, continuous and integral single-piece main drive shaft having the same relatively small uniform non-circular cross-section over its whole length directly receives by each said first gear means to rotate same, said first gear means mounted in said main frame means, said second gear means rotating cutters, the physical characteristics of said main drive shaft being such that said drive shaft is capable of absorbing without breaking external forces exerted on said cutters by striking obstacles such as stones or the like without damaging the machine.

22. A mowing machine as claimed in claim 21, wherein said main drive shaft has a non-circular cross-section of about 12 millimeters across its width, said main drive shaft during operation undergoes torsional deformation of at least 5.5 degrees per meter length and is capable of withstanding up to about 28 degrees torsional deformation per meter length before its yield point is reached.

23. A mowing machine which comprises:
a main frame means, said main frame means being provided with a plurality of housings for driving units spaced longitudinally along said frame means, each of said driving units supporting at least one upwardly extending shaft so as to be rotatable in said housing, said shaft being rotatably supported in a locking ring bolted on the upper side of said housing;
a cutting holder of a cutting unit mounted on said shaft;
two cutters mounted on said cutting holder opposite one another relative to said shaft, said cutters being pivotally mounted to said cutting holder about pivot axes parallel to said shaft;
a first bevel gear wheel mounted on the lower end of said shaft so as to be housed in said housing of said driving unit, said first bevel gear wheel meshing with a second bevel gear wheel provided near one end of a sleeve rotatably mounted in said housing, said sleeve being borne in bearings provided on both ends of said sleeve, said ends mounted in opposing sides of said housing, said first and second bevel gear wheels having a gear ratio such that said second bevel gear wheel mounted on said sleeve drives, during operation of the machine, said first gear wheel mounted on the bottom of said shaft at revolutions per minute which are at least fifty percent less than the revolutions per minute of said second bevel gear wheel mounted on said sleeve, a portion of the inner surface of said sleeve defining a non-circular inner hole near said end near said second gear wheel and the remainder of said inner surface of said sleeve defining a further hole which is larger than said non-circular hole, said further hole extending to the other end of said sleeve from said non-circular hole;
an integral, continuous, elongated, narrow one-piece drive shaft extending the length of said main frame means and passing respectively through said non-circular hole of said sleeve in said housing of each said driving unit, said drive shaft having, at least where passing through said respective non-circular hole in each said sleeve, a complementary non-circular outer circumference so as to be drivingly connected with each said sleeve, one end of said drive shaft being drivably connected with transmission means in a gear box means mounted on one end of said main frame means, said gear box means further attached to an intermediate frame, said intermediate frame being connected to a tractor or like vehicle for moving said mowing machine during operation over the ground, said intermediate frame having an input shaft which can be connected to a power take-off shaft of the tractor, said transmission means connecting said input shaft and said drive shaft so as to drive said drive shaft from said input shaft during operation of said mowing machine, the transmission ratio between said input shaft and said drive shaft being such that said drive shaft can be driven from said input shaft with revolutions per minute which are at least ten times larger than the revolutions per minute of said input shaft said high operative revolutions per minute and the narrowness of said drive shaft functioning to permit said drive shaft to absorb external forces impacting said cutting units when said cutting units encounter external objects, such as a stones.

24. A mowing machine as claimed in claim 23, wherein said transmission ratio is chosen such that during operation of the device, the drive shaft is rotated at about 9500 rpm from the input shaft connected to the tractor's power take-off shaft, said power take-off shaft having an operating rpm of about 540.

25. A mowing machine as claimed in claim 23, wherein said drive shaft rotates, during operation of said mowing machine, each said cutter unit such that said cutters move at about seventy to eighty-five meters per second in normal operations.

26. A mowing machine, which comprises:
a main frame means, said main frame means being provided with a plurality of housings for driving units, each said driving unit supporting at least one upwardly extending shaft so as to be rotatable in said housing;
a cutting unit having at least one pivotable cutter being mounted on each said shaft;
two meshing bevel gear wheels mounted in said housing, a first said bevel gear bevel wheel being provided on the lower end of each said shaft and a second said bevel gear wheel being provided near one end of a sleeve rotatably mounted in each said housing, said sleeve being borne in bearings provided on each end of said sleeve and mounted at opposite sides of said housing, the gear ratio between said first and second bevel gear wheels being such that said second bevel gear wheel provided on said sleeve drives, during operation of the mowing machine, said first bevel gear wheel mounted on said shaft at revolutions per minute which are at least fifty percent less than the revolutions per minute of said second bevel gear wheel on said sleeve, said sleeve having a non-circular inner hole near the end having said second bevel gear wheel;
an elongated, relatively narrow, continuous and integral single piece drive shaft having a uniform non-circular cross-section over its entire length, said drive shaft extending the complete length of said main frame means and extending through said non-circular hole of said sleeve in said housing of each said driving unit, said drive shaft having a non-circular outer circumference so as to be drivingly connected with each said sleeve;
a transmission means, one end of said drive shaft being drivably connected with said transmission means;
a gear box means for holding said transmission means, said gear box means fastened at one end to said main frame means and mounted at an opposite end to an intermediate frame, said intermediate frame being capable of attachment to a tractor or like vehicle for moving said mowing machine during operation over the ground, said intermediate frame having an input shaft which can be connected to a power take-off shaft of the tractor, said transmission means interconnecting said input shaft and said drive shaft to drive said drive shaft from said input shaft during operation of the machine, the transmission ratio between said input shaft and said drive shaft being such that said drive shaft can be driven from said input shaft with revolutions per minute which are at least ten times larger than the revolutions per minute of said input shaft;
wherein said cross-section of said drive shaft is such that said drive shaft is capable of substantial resilient torsional deformation so that external forces exerted on said cutting units by said cutting unit striking obstacles such as stones or the like can be absorbed by the drive shaft when being rotated at high speeds of rotation without breaking or being permanently deformed.

27. A mowing machine which comprises:
a main frame means, said main frame means providing a plurality of housings for driving units spaced longitudinally along said frame means, each said driving unit supporting at least one upwardly extending shaft such that said upwardly extending shaft is rotatable in said housing of each said driving unit, said upwardly extending shaft being rotatably supported in a locking ring bolted on the upper side of each said housing;
a cutting unit holder of a cutting unit provided on each said driving unit being rotatably connected with said upwardly extending shaft, two cutters being mounted on said cutting holder opposite one another relative to said shaft, said cutters being pivotable relative to said cutting holder about pivot axes parallel to said shaft;
a driven bevel gear wheel being mounted on the lower end of said shaft and being provided in said housing of said driving unit, said driven bevel gear wheel meshing with a driven bevel gear wheel provided near one end of a sleeve rotatably mounted in each said housing, said sleeve being borne in bearings provided on said sleeve, the gear ratio between said driven and driving bevel gear wheels being such that said driving bevel gear wheel drives, during operation of the machine, said driven bevel gear wheel at revolutions per minute which are at least fifty percent less than the revolutions per minute of said driving bevel gear wheel, said sleeve having a non-circular inner hole;
a drive shaft being mounted through said inner hole of said sleeve, said drive shaft integrally extending through said inner hole of said sleeve in said housing of each respective said driving unit, said drive shaft having at least near said non-circular inner hole in each said sleeve, a complementary non-circular outer circumference so as to be drivingly connected with said sleeves, one end of said drive shaft being drivably connected with one of a series of spur-gear wheels mounted in a gear box fastened to one end of said main frame means, said gear box being coupled through a further gear box with an intermediate frame capable of being attached to a tractor or like vehicle for moving said mowing machine during operation over the ground, said intermediate frame having an input shaft which can be connected to a power take-off shaft of the tractor, said intermediate frame being provided with a belt drive means interconnecting said input shaft and a bevel gear means in said further gear box, said bevel gear means being connected through said series of spur-gear wheels with said drive shaft, the transmission ratios between said input shaft and said drive shaft being such that said belt drive means, said bevel gear means and said series of spur-gear wheels each increase the rotations per minute of said input shaft to the rotations per minute of said drive shaft whereby said drive shaft can be driven from said input shaft with revolutions per minute which are at least ten times larger than the revolutions per minute of said input shaft.

28. A mowing machine which comprises:

a main frame means, said main frame means providing a plurality of housings for driving units spaced longitudinally along said frame means, each said driving unit supporting at least one upwardly extending shaft so as to be rotatable in said housing of said driving unit, said upwardly extending shaft having a splined portion and a hub mounted on said splined portion so as to be rotatable with said upwardly extending shaft, said hub being rotatably supported by two bearings in a locking ring bolted on the upper side of said housing, the upper end of said upwardly extending shaft having a screwthreaded end portion;

a cutter holder being clamped on the upper end of said hub by a cap mounted on the upper end of said upwardly extending shaft by a nut screwed onto said screwthreaded end portion of said shaft;

two cutters mounted on said cutting holder opposite one another relative to said upwardly extending shaft, said cutters being pivotable relative to said cutting holder about pivot axes parallel to said shaft;

a driven gear wheel mounted on the lower end of said upwardly extending shaft and contained within said housing of said driving unit, said driven bevel gear wheel meshing with a driving bevel gear wheel provided near one end of a sleeve rotatably mounted in said housing, said sleeve being borne in bearings provided on both ends of said sleeve and at opposite sides of said driving bevel gear wheel, the gear ratio between said bevel gear wheels being such that said driving bevel gear wheel drives, during operation of the machine, said driven bevel gear wheel at revolutions per minute which are at least fifty percent less than the revolutions per minute of said driving bevel gear wheel, said sleeve having a non-circular inner hole near an end having said driving bevel gear wheel and a further hole which is wider than said non-circular hole, said further hole extending from said non-circular hole to the other end of said sleeve;

a drive shaft being mounted through the continuous said non-circular hole and said further hole of each said sleeve, the centerline of said drive shaft intersecting the centerline of each said upwardly extending shaft, said drive shaft integrally extending the entire length of said main frame means through said holes in said sleeve of each said driving unit, said drive shaft having, at least near said respective non-circular holes in each said sleeve, a non-circular outer circumference so as to be drivingly connected with each said sleeve, one end of said drive shaft being drivably connected with spur gear wheels mounted in a gear box means, said gear box means fastened to one end of said main frame means, said gear box means being further coupled with an intermediate frame capable of attachment to a tractor or like vehicle for moving said mowing machine over the ground during operation, said intermediate frame having an input shaft which can be connected to a power take-off shaft of the tractor, said intermediate frame having drive belt means between said input shaft and gear means contained in said gear box means, said gear means further comprising bevel gear means and spur gear wheels to drive said drive shaft from said input shaft during operation of the machine, the drive ratio between said input shaft and said drive shaft being such that said drive shaft can be driven from said input shaft with revolutions per minute which are at least ten times greater than the revolutions per minute of said input shaft.

* * * * *